No. 888,479.
O. C. EDWARDS, Jr.
CAISSON.
APPLICATION FILED JULY 17, 1906.
PATENTED MAY 26, 1908.
5 SHEETS—SHEET 2.
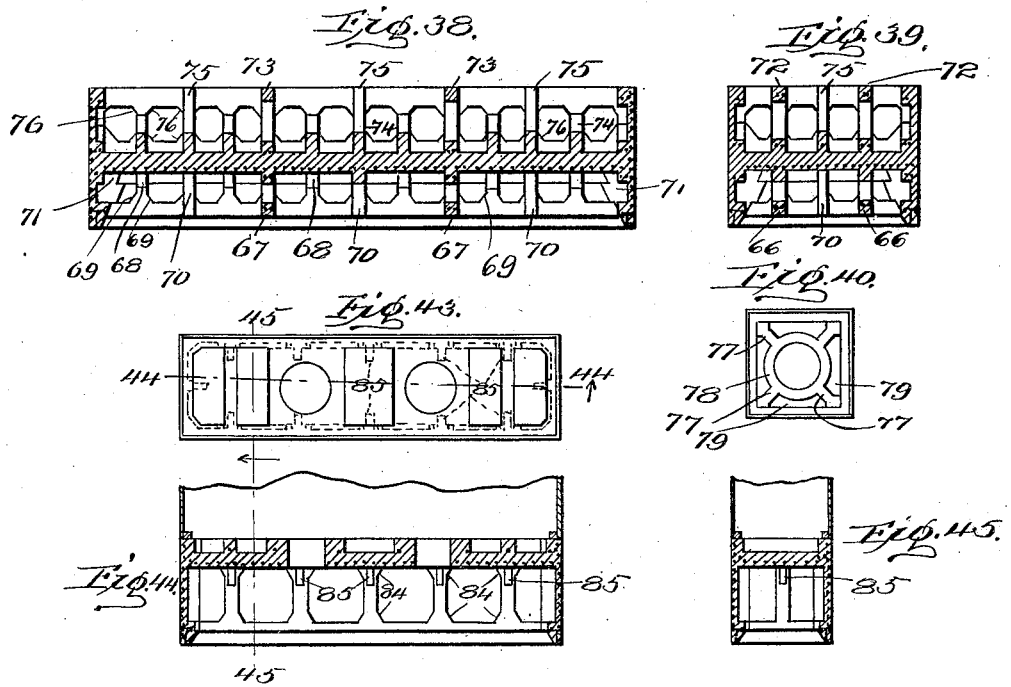
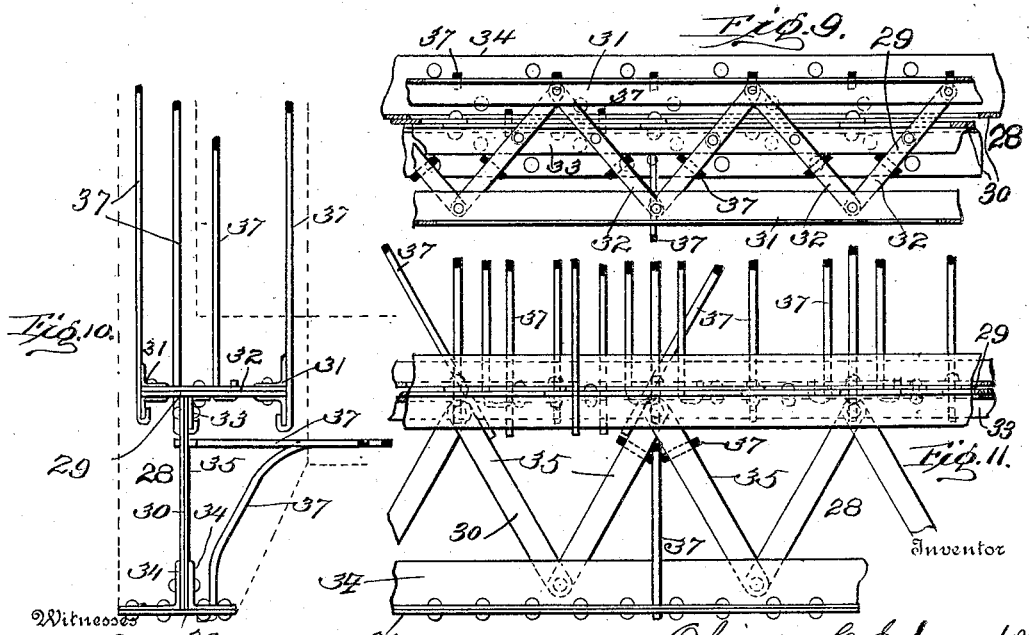

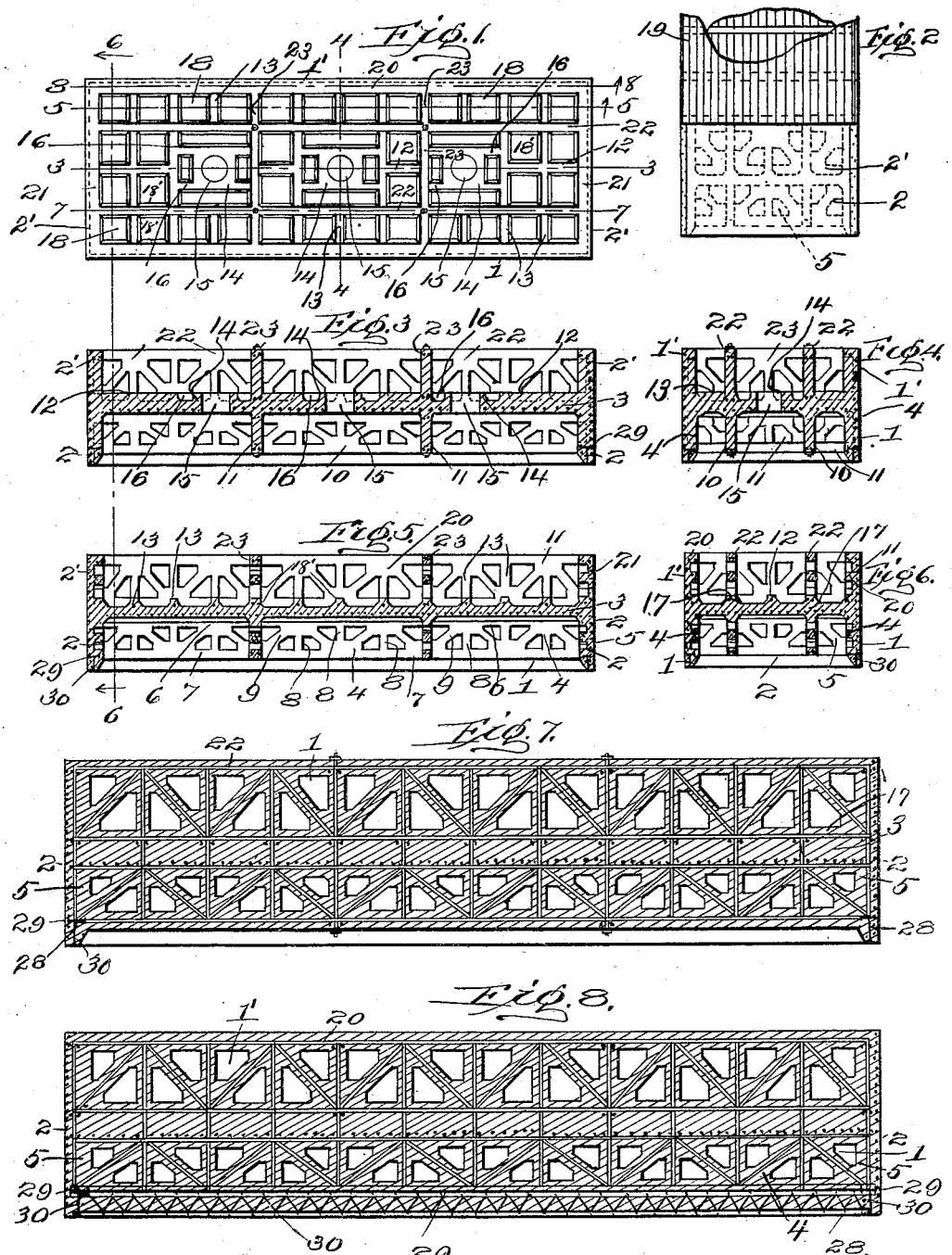

No. 888,479. PATENTED MAY 26, 1908.
O. C. EDWARDS, JR.
CAISSON.
APPLICATION FILED JULY 17, 1906.
5 SHEETS—SHEET 3.
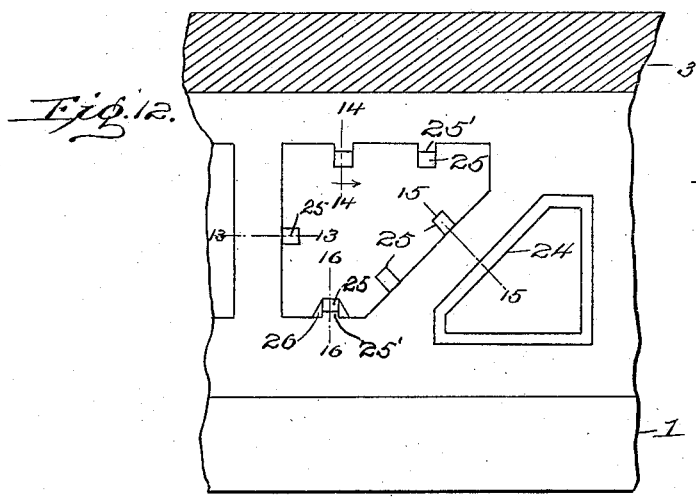
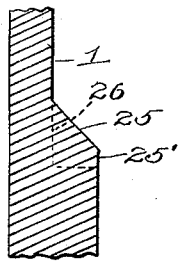
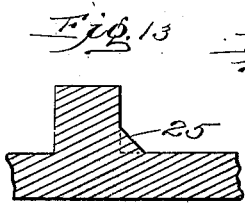
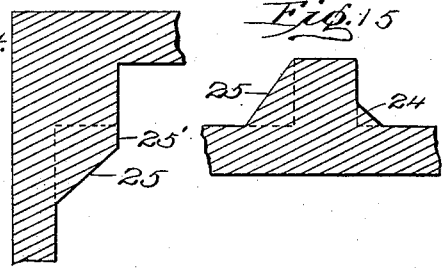
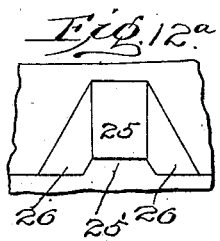
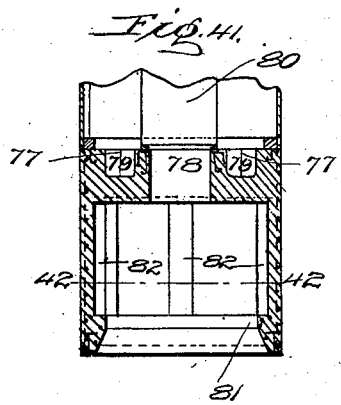
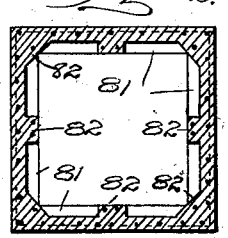

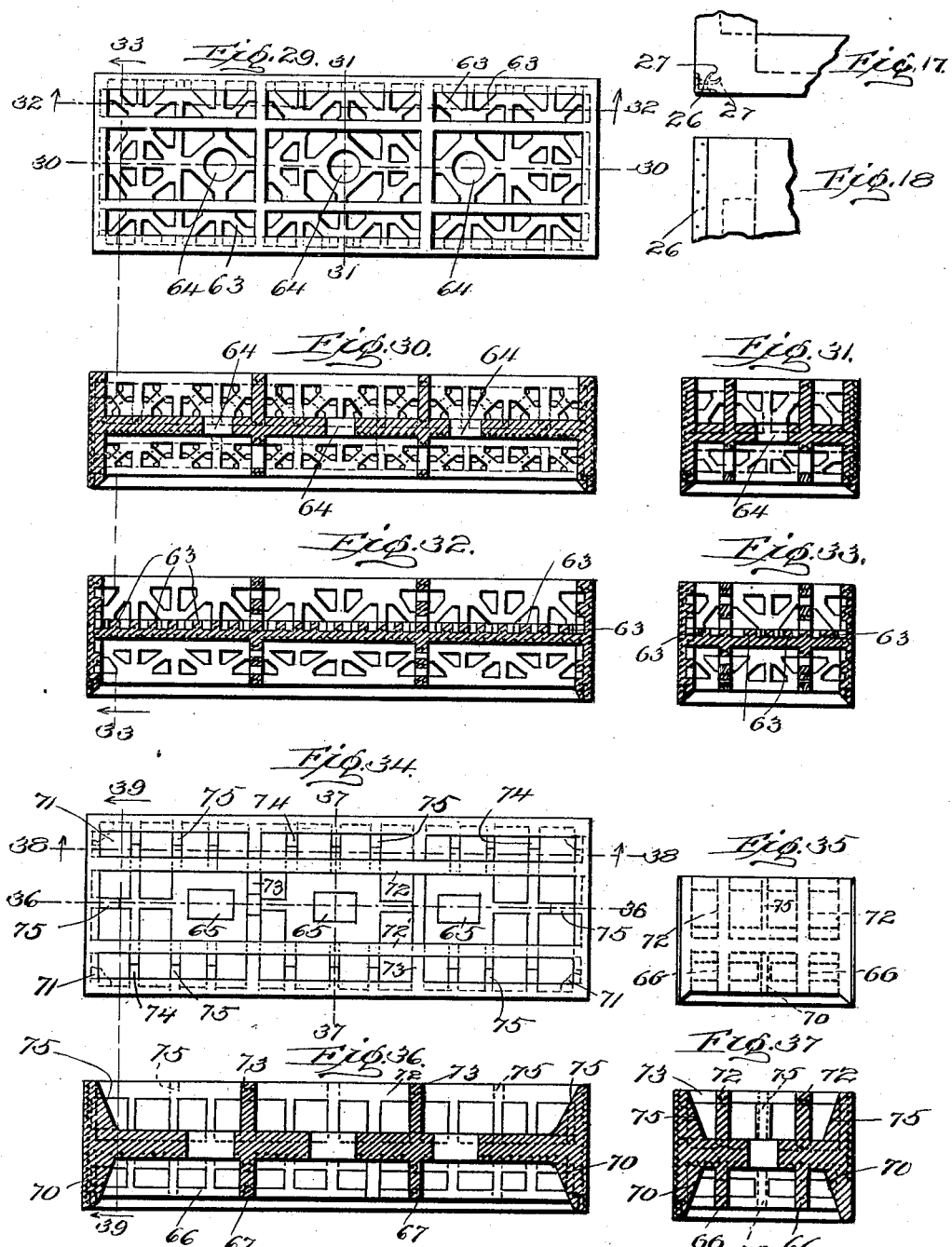

No. 888,479. PATENTED MAY 26, 1908.
O. C. EDWARDS, Jr.
CAISSON.
APPLICATION FILED JULY 17, 1906.
5 SHEETS—SHEET 5.
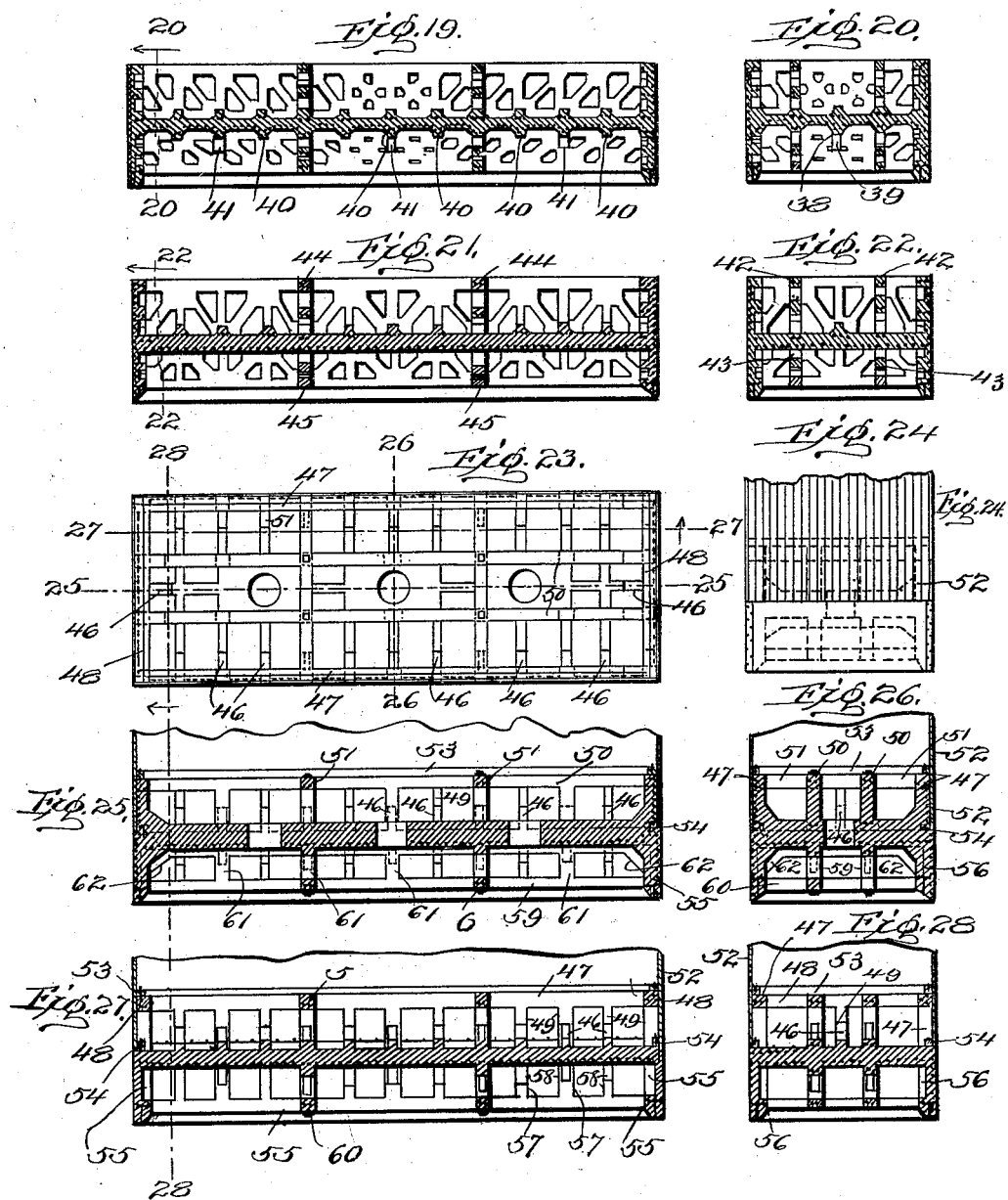

UNITED STATES PATENT OFFICE.

OLIVER CROMWELL EDWARDS, JR., OF TROY, NEW YORK.

CAISSON.

No. 888,479.　　　Specification of Letters Patent.　　　Patented May 26, 1908.

Application filed July 17, 1906. Serial No. 326,622.

*To all whom it may concern:*

Be it known that I, OLIVER C. EDWARDS, Jr., citizen of the United States, residing at Troy, in the county of Rensselaer and State of New York, have invented certain new and useful Improvements in Caissons; and I do hereby declare the following to be a full, clear, and exact description of the invention, such as will enable others skilled in the art to which it appertains to make and use the same.

This invention relates to improvements in caissons, and more particularly to a design of caisson especially adapted for economical construction from concrete.

The primary object in view is the production of a concrete caisson so designed as to possess a maximum amount of strain withstanding capacity while incorporating only a minimum amount of material, whereby a saving is obtained both as to the weight of the caisson and the expense of production.

With this and further objects in view, the invention comprises the combination of relatively thin inclosing walls and a roof forming a working chamber, of stiffening trusses formed integral with the side walls, and stiffening trusses for the roof.

The invention further comprises the combination with a caisson working chamber of stiffening trusses formed integral with the side walls thereof.

The invention also comprises the combination with concrete caisson walls, of a metallic truss forming a reinforcement for the cutting edge of said wall.

The invention still further comprises certain other novel constructions, combinations and arrangements of parts as will be hereinafter fully described and claimed.

In the accompanying drawing: Figure 1 is a top plan view of a caisson embodying the features of the present invention. Fig. 2 is an end elevation thereof, a fragment of a coffer dam being illustrated as mounted thereon. Fig. 3 is a longitudinal, vertical, central section taken through Fig. 1 on the plane indicated by line 3—3. Fig. 4 is a transverse, vertical, central section taken through the structure illustrated in Fig. 1 on the plane indicated by line 4—4. Fig. 5 is a longitudinal, vertical section through the structure illustrated in Fig. 1, taken on the plane indicated by line 5—5, looking in the direction indicated by the arrow. Fig. 6 is a transverse, vertical section through the structure disclosed in Fig. 1, taken on the plane indicated by line 6—6 of Figs. 1, 3 and 5. Fig. 7 is a longitudinal, vertical section through the structure illustrated in Fig. 1, taken on the plane indicated by line 7—7 and looking in the direction indicated by the arrow, the parts being illustrated on an enlarged scale. Fig. 8 is a similar section taken on the plane of line 8—8 of Fig. 1 and looking in the direction indicated by the arrow. Fig. 9 is a top plan view of a fragment of the metallic reinforcement for the cutting edge. Fig. 10 is an end view of the same, the concrete walls and wall trusses and the lower chord of a chamber or wall truss being indicated by dotted lines. Fig. 11 is a view in side elevation thereof. Fig. 12 is an enlarged detail view partly in elevation and partly in section of a fragment of one of the caisson walls and roof and illustrating two of the wall panels. Fig. 12$^a$ is an enlarged, detail of one of the knee-braces of Fig. 12. Fig. 13 is a sectional view in detail, taken on the plane of line 13—13 of Fig. 12. Fig. 14 is a similar view taken on the plane of line 14—14 of Fig. 12. Fig. 15 is a similar view taken on the plane of line 15—15 of Fig. 12. Fig. 16 is a similar view taken on the plane of line 16—16 of Fig. 12. Fig. 17 is a top plan view of a fragment of one of the corners of the caisson, indicating in end view the corner protecting angle plate and illustrating the supporting pins or bolts therefor. Fig. 18 is a view in elevation of the same. Fig. 19 is a longitudinal, vertical section, similar to Fig. 5, but taken through a slightly modified form of caisson. Fig. 20 is a transverse, vertical section taken on the plane of line 20—20 of Fig. 19 and looking in the direction indicated by the arrow. Fig. 21 is a longitudinal, vertical section similar to Fig. 19 of another modified form of caisson. Fig. 22 is a transverse, vertical section taken on the plane of line 22—22 of Fig. 21 and looking in the direction indicated by the arrow. Fig. 23 is a top plan view of another modified form of caisson. Fig. 24 is an end view thereof, a fragment of coffer dam being indicated as mounted thereon. Fig. 25 is a longitudinal, vertical, central section taken on the plane of line 25—25 of Fig. 23. Fig. 26 is a transverse, vertical, central section taken on the plane of line 26—26 of Fig. 23. Fig. 27 is a longitudinal, vertical section taken on the plane of line 27—27 of Fig. 23 and looking in the direction indicated by the arrow. Fig. 28 is a transverse, vertical section taken on the plane of line 28—28 of Figs. 23, 25 and 27 and looking in the direction indicated by the arrow. Fig. 29 is a top plan view of another modified form of caisson. Fig. 30 is a longitudinal, vertical, central section taken on the plane of line 30—30 of Fig. 29. Fig. 31 is a transverse, vertical, central section taken on the plane of line 31—31 of Fig. 29. Fig. 32 is a longitudinal, vertical section taken on the plane of line 32—32 of Fig. 29, looking in the direction indicated by the arrow. Fig. 33 is a transverse, vertical section taken on the plane of line 33—33 of Figs. 29, 30 and 32 and looking in the direction indicated by the arrow. Fig. 34 is a top plan view of a further modified form of caisson. Fig. 35 is an end view thereof. Fig. 36 is a transverse, vertical, central section taken on the plane of line 36—36 of Fig. 34. Fig. 37 is a transverse, vertical, central section taken on the plane of line 37—37 of Fig. 34. Fig. 38 is a longitudinal, vertical section taken on the plane of line 38—38 of Fig. 34 and looking in the direction indicated by the arrow. Fig. 39 is a transverse, vertical section taken on the plane of line 39—39 of Figs. 34 and 36 and looking in the direction indicated by the arrow. Fig. 40 is a top plan view of a further embodiment of the present invention. Fig. 41 is a transverse, vertical, central section therethrough, a fragment of a coffer dam being illustrated as being mounted upon the caisson. Fig. 42 is a horizontal section taken on the plane indicated by line 42—42 of Fig. 41. Fig. 43 is a top plan view of a further modification. Fig. 44 is a longitudinal, vertical section taken on the plane of line 44—44 of Fig. 43 and looking in the direction indicated by the arrow. Fig. 45 is a transverse, vertical section taken on the plane indicated by line 45—45 of Figs. 43 and 44 and looking in the direction indicated by the arrow.

While I have illustrated in the accompanying drawings a few modifications showing several different embodiments of the present invention, a careful study of the drawings will disclose the fact that throughout all of the structures there is found a broad conception of the use of comparatively thin walls strengthened by stiffening trusses which are cast integral with the walls. This principle of construction enables the use of concrete and the production of strong, rigid walls therefrom capable of resisting all the strains to which a caisson is usually subjected, the objection to the weight of the concrete being obviated by the comparative thinness of the walls. The corners of the caisson and the cutting edge thereof are also stiffened and protected by metal devices hereinafter fully described.

Perhaps the simplest form of caisson embodying the features of the present invention illustrated in the accompanying drawings is seen in Figs. 40, 41 and 42, but for the purpose of making clear the adaptation of the invention to the larger types of caisson, I shall describe the construction illustrated in Figs 1 to 16 inclusive as an exemplification of the invention.

Referring to the drawings by numerals, 1—1 indicates the vertical side walls, and 2—2 the vertical end walls of the caisson. The said side and end walls are preferably cast of concrete, a roof 3 cast integral with said walls completing a caisson working chamber. It will be noted that the said vertical walls and the roof are made relatively thin and cast integral; with each of the side walls is a truss 4, and cast integral with each of the end walls is a similar truss 5, said trusses being arranged for stiffening and strengthening the respective walls. Each of the trusses 4 and 5 may be constructed in any preferred form, and I have shown, for the purpose of illustration, each of said trusses composed of an upper chord 6 and a lower chord 7, the said chords being connected at intermediate points by vertical studs 8—8, and also connected by inclined braces 9—9 interposed between the studs 8. Each of the said chords, studs and braces is cast integral with the respective vertical wall, and the truss formation produced thereby renders the wall firm and rigid and capable of withstanding enormous strains, while the weight of the wall is not materially increased over that of the comparatively thin solid wall. As seen in Figs. 3 and 4, I preferably further strengthen the structure by longitudinal and transverse trusses extending entirely across the space of the working chamber and having their ends cast integral with the vertical walls. Each of the trusses 10 and 11 is preferably made up of an upper chord formed integral with the roof, a lower chord and integral, vertical studs and inclined braces connecting the upper and lower chords.

The roof 3 is made comparatively thin and is stiffened by longitudinal and transverse trusses produced by a longitudinal beam 12 and transverse beams 13—13. The beam 12 is interrupted at various points along its length by solid portions 14—14 of the roof at the points of the openings 15—15, the said solid portions being mere thickened parts of the roof for strengthening the roof about the openings 15. The openings 15 are provided for the spoil shafts and main shaft, and each of said thickened portions is connected with a contiguous transverse beam 13 by parallel, longitudinal beams 16—16, so that the beam 12 may be considered continuous when the beams 16 and the solid portions 14 are considered as parts of the beam 12. Arranged parallel to the beam 12 and extending longitudinally of the caisson are beams 17—17, which beams 17 with the beam 12 constitute roof stiffening trusses, all of said beams being cast integral with the roof, and the cross beams 13 may be considered the connecting braces of the trusses, said cross beams and longitudinal beams producing roof panels 18—18. Each of the beams 12, 13 and 17 is provided at each side with stiffening and strengthening, relatively small knee-braces 18'.

By preference, I continue the walls 1—1 upwardly beyond the roof, as at 1'—1', and also continue the walls 2 upwardly beyond the roof, as at 2'—2', the said walls 1' and 2' forming a cofferdam structure. Of course, the coffer dam structure may be made of any required depth, but by preference a wooden cofferdam 19 is mounted upon the walls 1' and 2' so that said walls are preferably extended upwardly only a relatively short distance. As seen best in Figs. 5 and 6, each of the walls 1' is provided with a stiffening truss 20, similar in construction and arrangement to trusses 4, and each of the walls 2' is provided with a stiffening truss 21 similar in construction and arrangement to the trusses 5. Longitudinal trusses 22—22 extend parallel to each other throughout the length of the coffer dam and connect the end walls thereof, and transverse trusses 23—23 extend across the coffer dam and connect the side walls thereof. Each of the trusses 23 is similar in construction and arrangement to the trusses 11, except, of course, that the lower chord is formed integral with the roof instead of the upper chord and the lower chords of the trusses 22 are formed from the beams 17—17. The upper and lower chords of the longitudinal trusses 22 are connected by vertical studs and inclined braces similarly to the braces of the trusses 10. The transverse trusses 23 are constructed and arranged similarly to the trusses 11, except that the lower chords are formed integral with the roof instead of the upper chords, the same form of inclined braces and vertical studs being provided. The trusses 11 preferably, though not necessarily intersect the trusses 10 in vertical alinement with the points of intersection of the trusses 23 with the trusses 22, and all the said trusses may if preferred be tied together by vertical tie rods extending throughout the length of the vertical posts produced by the intersection of the trusses, as clearly seen in Fig. 7. I propose also to tie the various other parts of the caisson by metallic rods or bars, and to stiffen the braces and studs of the trusses as well as other parts of the caisson by suitable metallic reinforcement as I may find desirable. I have illustrated the bars arranged centrally of the braces, and only one bar is shown for each brace, but it is, of course, obvious that any arrangement and any preferred number of bars may be employed as found desirable.

It has been noted above that the trussing of the roof for the stiffening of the same produces panels and it will, of course, be obvious that the wall trusses also produce panels, and I have shown a detail construction of one of the wall panels in Figs. 12 to 16 inclusive. I have omitted such detail construction from the illustrations in Figs. 1 to 8 inclusive, for the purpose of clearness, and it is to be understood that the detail construction shown in Figs. 12 to 16 inclusive is to be employed if desired in connection with all of the wall panels.

Each of the inclined braces and vertical studs as well as the contiguous chords of each of the wall panels may be stiffened and strengthened by a continuous knee-brace 24 extending about the entire panel, or if preferred, the knee-brace need not be made continuous but may be formed only at intervals, as indicated at 25—25. When the knee-braces 25 are employed, they are preferably made of a height equal to the thickness of the particular brace or chord, but when the knee-brace 24 is utilized, the same need not necessarily be extended to the full height of the brace or chord. Of course, if preferred the knee-brace 25, as seen in Fig. 13, may be made of a less height than the width of the member which it braces. As seen in Fig. 12, the knee-braces 25 may if preferred be themselves strengthened and braced by fillings 26—26, the said fillings 26 being of trihedral angle form, filling the corner produced by the juncture of the face of the knee-brace with the face of the braced member and with the face of the vertical wall.

It is to be noted that all of the knee-braces referred to are mere variations of the knee-brace seen at 24, the braces 25 which are not provided with the trihedral angle fillings being merely fragments of the continuous knee-brace, and the knee-braces 25 provided with the fillings 26 being the same fragments with additional fragments arranged for advantageously bracing the particular member with which the given knee-brace is connected. It is to be observed particularly from Figs. 14 and 16 that the knee-brace 25 may assume a form larger than a mere incline filling, and may be provided with a body portion 25' which extends to the full width of the member braced and projects into the panel, and the knee-brace proper 25 connects the wall with the body portion 25'. The form of knee-brace embodying the body portion 25', of course, possesses greater rigidity and aids more materially in bracing a member with which it is connected, although the use of the body portion 25' necessarily adds to the weight of the construction.

As seen in Figs. 17 and 18 each of the corners of the caisson is protected by an angle plate 26. Each of the plates 26 is preferably formed flush with the outer surface of the caisson wall, and is also preferably firmly secured in place by means of bolts or pins 27—27 which are anchored in the material of the corner of the caisson, the heads of the pins or bolts being embedded in the material of the plate so as to lie flush with the exposed face thereof. The plates 26 guard the corners during the descent of the caisson and prevent injury to such corners which might occur from contact with rocks.

The cutting edge of the caisson is provided with a metallic reinforcement 28. The said reinforcement is seen in detail in Figs. 9 to 11, and consists of a horizontal truss 29 with a vertical truss 30 depending therefrom. The truss 29 is made up of chords 31—31 and an intermediate connecting and bracing web 32—32. To the web 32 is secured an angle plate 33 which constitutes the upper chord of the truss 30. A pair of angle plates 34—34 constitutes the lower chord of the said truss 30 and the said chords are connected by an intermediate open web 35. A plate 36 is secured to the angle plates 34 and extends the full width of the two plates, or if preferable it may be wider than the angle plates. Suitable reinforcing bars 37—37 are arranged at any desired points and secured to the trusses 29 and 30 and extend in various directions within the concrete forming the walls, the wall trusses, and chamber trusses of the caisson. The horizontal truss stiffens the chamber wall and wall truss against the inward and outward pressure of the surrounding earth and water, and of the chamber air, respectively, and the vertical truss furnishes the necessary tensile strength to the lower chord of the wall truss, the open webs of both trusses permitting an intimate bond between the trusses and the surrounding concrete. The plate 36 materially increases the capacity of the cutting edge for penetrating hard materials without being materially damaged thereby.

From the foregoing it will be seen that the present invention comprehends the production of a comparatively light and yet exceptionally strong and rigid caisson, of relatively cheap material, which caisson has the advantage of being capable of being used as a part of the finished structure without danger of destruction or material deterioration from age, marine borers or the action of water, and it will be further noted that the various other embodiments of the invention illustrated incorporate the general principles present in the caisson above described.

Owing to the close similarity between the caisson above described and the several modifications, only those features in the modifications which differ from the above described structure will be described in detail, and the remaining features will be simply referred to generically, as they may be readily understood by reference to the foregoing description.

It is to be observed that the structure above described is provided with a roof stiffening truss arranged on top of the roof with no horizontal truss formation on the under face of the roof, and the reason for this is that is is difficult to fill with concrete any pocket or recess so arranged as to be filled with air and have the point of discharge of the air cut off before the pocket is completely filled. However, any ordinary pocket may be filled with grout or concrete by the use of a force pump and a pipe extending into the pocket, which pipe is removed after the pocket has been filled. It will thus be seen that while the pocket is objectionable it is not fatal to a construction, and therefore, when it is desired to make the roof thinner than the roof of the structure above described, I propose to construct the caisson as illustrated in Figs. 19 and 20, wherein is shown a roof provided with a longitudinal beam 38 formed integral at its ends with the end walls of the caisson and braced at each end by a knee-brace 39. Transverse beams 40—40 are provided beneath the roof, and some of the said beams 40 are braced at their ends by knee-braces 41—41, all of the said beams 40 being formed integral at their ends with the side walls of the caisson. Of course, all of the beams 40 and the beam 38 are formed integral with the roof, and said beams constitute a stiffening truss for the roof arranged beneath the same. All the other features of the structure illustrated in Figs. 19 and 20 are common to the structure above described.

In Figs. 21 and 22 I have illustrated a structure corresponding in detail to the structure seen in Figs. 1 to 16 inclusive, except that the longitudinal trusses 42—42 of the coffer dam and 43—43 of the working chamber, and the transverse trusses 44—44 of the coffer dam and 45—45 of the working chamber have each one chord incorporated as an integral part of the roof, or in other words that chord of each truss next to the roof has no separate entity from the roof, but the roof is made to serve the function of the chord and for this reason is made slightly thicker than otherwise.

In Figs. 23 to 28 inclusive I have illustrated a caisson whose roof is trussed in the coffer dam similarly to the truss formation shown in Figs. 1 to 16 inclusive, the longitudinal and transverse beams being braced at their ends by knee-braces 46—46. In this construction, however, the coffer dam consists of longitudinal side trusses 47—47 and transverse end trusses 48—48, said side and end trusses being connected with the roof by vertical posts or studs 49—49, which posts or studs are formed integral with the knee-braces 46. The end trusses 48 are connected by longitudinal trusses 50—50, and the longitudinal trusses 47 are connected by transverse trusses 51—51. The trusses 50 and 51 are of the simplest possible construction, and are provided with top and bottom chords and vertical studs only, the inclined braces being omitted. The coffer dam structure proper 52 is arranged to inclose the trusses 47 and 48 and is provided with an upper wale 53 resting upon the upper chords of the trusses 47 and 48 and is also provided with a lower wale 54 resting upon the roof and embedded in the material of the vertical posts 49. The wales 53 and 54 are secured firmly in place by bolts or pins passed through the wales and embedded in the contiguous concrete. The coffer dam proper is thus firmly sustained upon the caisson, and the caisson is at the same time materially reduced in weight. The working chamber of the caisson is made of relatively thin vertical walls formed with the end wall trusses 55—55 and side wall trusses 56—56, each of the said end and side wall trusses being made up simply of a lower chord and vertical posts 57—57 connecting such chord with the roof, the roof serving as the upper chord for all of the side and end wall trusses. The vertical posts or studs 57 are braced by knee-braces 58—58 formed integral with said studs and with the roof. Longitudinal trusses 59—59 are arranged within the working chamber and similar transverse trusses 60—60 are arranged therein, each of the trusses 59 and 60 consisting simply of upper and lower chords connected by vertical studs 61—61. The upper chord of each of said trusses is, as indicated in the drawings, formed integral with the roof and is braced at each end by a knee-brace 62 which is also formed integral with the roof and is in addition formed integral with the vertical walls of the working chamber.

In Figs. 29 to 33 inclusive, I have illustrated a further embodiment of the present invention incorporating substantially the same features shown in and described with respect to Figs. 1 to 16 inclusive, the only important difference being that the roof trusses are, in addition to being constructed of the longitudinal and transverse beams, formed with diagonal braces 63—63 constructed and arranged similarly to the arrangement of diagonal braces in the side wall stiffening trusses, seen best in Fig. 8. This produces a light roof and gives great strength against any racking of the caisson in a horizontal plane, such as it might receive while being towed in rough water. It is to be noted that the openings 64—64 for the spoil shafts and man shafts are so disposed that the weight of the shafts will be transmitted directly to the longitudinal trusses and to the two transverse coffer roof beams, so that there will be no danger of the concrete cracking around the shafts due to any slight swaying of the shafts. It will be observed that the diagonal braces of the longitudinal trusses in the coffer dam and also the diagonal braces of the longitudinal trusses in the working chamber are disposed in such positions as to appear at right angles to the inclined braces in the wall trusses. But it is, of course, obvious that this is a mere matter of choice of arrangement for obtaining advantageous transmission of stress under some particular conditions.

In Figs. 34 to 39 inclusive, I have illustrated another embodiment of the invention in which the concrete walls are extended above the roof for producing a coffer dam, the upright walls of the caisson being formed relatively thin and strengthened by wall trusses. The roof also is strengthened by stiffening trusses, the form of the roof trusses differing from those illustrated in Fig. 1 only in that the spoil shaft and man shaft openings 65 are formed rectangular instead of circular, and the solid, thickened portions of the roof about the said openings being formed to accommodate the rectangular apertures.

I have not illustrated the longitudinal and transverse beams forming the roof trusses as being provided with knee-braces such as are seen at 18' in Fig. 1, but it is, of course, obvious that such knee-braces may be employed if desired. The working chamber is formed with longitudinal trusses 66—66 and transverse trusses 67—67. Each of the trusses 66 and 67 consists simply of an upper and a lower chord and vertical braces or studs connecting the same, the upper chord being formed integral with the roof. The side and end walls of the working chamber are formed with stiffening trusses constructed similarly to the trusses 66 and 67. Some of the vertical studs of the wall trusses are strengthened by knee-braces 68 (see Fig. 38), each of the knee-braces being formed integral with the roof and with its respective stud. By preference the lower end of each of the vertical studs is further strengthened by relatively small knee-braces 69—69 formed integral with the lower chord of the respective truss, and also formed integral with the respective vertical stud. Those vertical studs which are not provided with the knee-braces 68 are provided with a larger knee-brace 70. The braces 70, as indicated in cross section in Figs. 36 and 37 and in full lines in Figs. 38 and 39, extending from the roof down to the lower edge of the lower chord, and are formed integral with the roof, the vertical stud, and the chord, the vertical stud, of course, being formed integral with the upright wall. The knee-braces 68 and 70 serve to withstand any inwardly crushing strains, and are especially designed to prevent lateral swaying of the wall trusses due to the impact of a wave. In order to further strengthen the upright walls, each of the corners produced by the juncture of the side walls with the end walls and with the roof is provided with a filling 71 which is of approximately trihedral angle form, the corners of the inner face of each of said fillings being cut away, as indicated in dotted lines in Fig. 34, in order to produce the required formation for the wall trusses.

The coffer dam walls are strengthened by wall trusses constructed like the wall trusses of the working chamber walls, and the coffer dam is further strengthened by longitudinal trusses 72—72 and by transverse trusses 73—73. The trusses 72 and 73 consist simply of upper and lower chords connected by vertical studs, the lower chord of each truss being formed integral with the roof. The vertical studs of the wall trusses are braced by knee-braces, some of the said vertical studs being braced by relatively small knee-braces 74 which extend inwardly and are formed integral with the roof of the caisson and with the respective vertical studs. Those studs which are not braced by the relatively small knee-braces 74 are braced by relatively large knee-braces 75—75, each of the braces 75 being formed integral with the roof and extending upwardly to the top of the upper chord of the respective wall truss, the said knee-brace being, of course, formed integral with the vertical stud and the stud in turn being formed integral with the upright wall. I have only shown a comparatively small number of the knee-braces 75 and a relatively larger number of the small knee-braces 74, but, of course, it is obvious that as many of the braces 75 will be employed as are found desirable. It is to be noted that each of the vertical studs of the wall trusses of the coffer dam is braced by relatively small knee-braces 76—76 at each end, each of said knee-braces being formed integral with the respective stud and also formed integral with the contiguous chord.

While the diagonal braces in the various trusses are not illustrated in connection with Figs. 34 to 39 inclusive, it is obvious that such braces might be employed, and in fact I propose to employ the same in connection with the caisson illustrated in the said figures whenever the caisson is to be subjected to exceptional service. The diagonal braces in the roof trusses may also be used in the construction seen in Figs. 34 to 39 inclusive, and the working chamber roof truss, indicated in Figs. 19 and 20, may be utilized in the caisson seen in Figs. 34 to 39 inclusive when found desirable. A caisson constructed as illustrated, in Figs. 34 to 39 inclusive, formed with the inclined braces for the wall trusses and for the transverse and longitudinal trusses, and also for the roof truss, and formed with a roof truss in the working chamber would incorporate all of the several details of the present invention, and in considering the appended claims it is desired that such a construction be understood to be the preferred embodiment of the present invention, and that the several modified constructions illustrated and described, have been disclosed for the purpose of making clear the several details and for preventing confusion by the showing of a multiplicity of parts in a single construction, it being understood, of course, that the corner plates seen in Figs. 17 and 18 and the cutting edge reinforcements seen in detail in Figs. 9 to 11 inclusive are employed regardless of the detail design of the particular caisson.

As showing one of the simplest forms of the present improved caisson, reference may be had to Figs. 40 to 42 inclusive, wherein is seen a rectangular caisson chamber of relatively small dimensions, the size of the caisson being such as to obviate the necessity for trusses within the working chamber. The roof is trussed by beams 77 arranged to connect the diagonally opposite corners, but interrupted intermediate their length by the circular thickened or solid portion of the roof 78, which produces roof panels 79—79 and is arranged to support the shaft 80. The circular thickened portion 78 is, of course, formed integral with the beams 77. The upright walls of the caisson are made relatively thin, and are strengthened by wall trusses formed from a lower chord 81 and vertical connecting studs 82—82 which extend to the roof, the roof serving as the upper chord, and the corner studs 82 being mere triangular fillings. As indicated in Fig. 41, the coffer dam is mounted directly upon the caisson and may be anchored thereto in any suitable manner.

In Figs. 43 to 45 inclusive, I have illustrated a further embodiment of the simpler form above described with reference to Figs. 40 to 42 inclusive. In the structures seen in Figs. 43 to 45 I have utilized the same form of wall trusses with knee-braces 84—84 for each of the ends of each of the vertical studs of the wall truss, each knee-brace 84 being formed integral with the respective stud and with the contiguous chord or with the roof as the case may be, the roof itself serving as the upper chord. Each of the vertical studs is further braced against inwardly acting strains by a knee-brace 85 arranged at its upper end and formed integral with the roof and with the respective knee-brace.

Having thus fully described my invention, what I claim as new and desire to secure by Letters Patent is:—

1. In a caisson, the combination with upright walls and a roof, of wall trusses arranged contiguous to the walls and formed integral therewith for strengthening the same.

2. In a caisson, the combination with upright inclosing walls, of trusses arranged parallel to and connected with the walls and formed integral therewith throughout their length.

3. In a caisson, the combination with upright inclosing walls, of a truss for each of said walls formed integral therewith.

4. In a caisson, the combination with upright inclosing walls, of a wall truss for each of said walls, each of said trusses extending throughout the length of its respective wall and being connected therewith.

5. In a caisson, the combination with inclosing concrete walls, of concrete trusses cast integral with said walls throughout their length.

6. In a caisson, the combination with upright walls and a roof forming the working chamber, of wall trusses formed integral with the upright walls throughout their length, and arranged for producing a substantially continuous truss about the inner faces of the upright walls.

7. In a caisson, the combination with upright walls and a roof forming a working chamber, of bracing means for said walls and roof extending across the space of the working chamber, and trusses connected throughout their length with the said upright walls.

8. In a caisson, the combination with inclosing walls and a horizontal roof therefor, of a horizontally disposed truss connected with the roof and arranged for strengthening the same.

9. In a caisson, the combination with inclosing walls and a roof therefor, of a truss having all of its members formed integral with the roof.

10. In a caisson, the combination with inclosing walls and a roof therefor, of a truss disposed horizontally with one of its faces connected with the roof and its ends connected with the inclosing walls.

11. In a caisson, the combination with inclosing walls and a roof therefor, of a truss disposed above the roof and in planes parallel to the upper face thereof and connected throughout its length with the said roof.

12. In a caisson, the combination with inclosing walls and a roof therefor, of a horizontally disposed truss arranged above said roof, and a truss arranged beneath the roof, the said trusses being formed integral with the roof.

13. In a caisson, the combination with inclosing walls and a roof therefor, of braced roof beams arranged beneath the roof and disposed with all of their members formed integral with said roof.

14. In a caisson, the combination with inclosing walls and a roof therefor, of braced roof beams arranged beneath the roof and each having one of its faces lying parallel to the plane of the under face of the roof, said beams being connected with the roof.

15. In a caisson, the combination with inclosing walls of a roof therefor, and longitudinal beams formed integral with the roof throughout their length and integral with the walls at their ends.

16. In a caisson, the combination with inclosing walls and a roof, of transverse beams formed integral with the roof and connected with the walls at their ends.

17. In a caisson, the combination with inclosing walls and a roof therefor, longitudinal beams formed integral with said roof, and transverse beams also formed integral with the roof and intersecting the longitudinal beams.

18. In a caisson, the combination with inclosing walls and a roof therefor, of a strengthening beam extending across the inclosure produced by said walls and connected with said roof, and knee-braces connected to the beam and to the roof.

19. In a caisson the combination with inclosing walls and a roof, of a beam extending across the inclosure produced by said walls and formed integral with the roof throughout its length, and knee-braces formed integral with the said beam and also formed integral with the roof.

20. In a caisson, the combination with inclosing walls and a roof, of a strengthening beam arranged above the roof and extending across the inclosure produced by said walls, the said beam being formed integral with the roof.

21. In a caisson, the combination with inclosing walls and a roof, of a beam extending across the inclosure produced by said walls, and bracing means formed integral with the roof and also formed integral with said beam.

22. In a caisson, the combination with inclosing walls and a roof therefor, of wall trusses formed integral with the walls throughout their length, the several members of each of said trusses being provided with strengthening knee-braces.

23. In a caisson the combination with inclosing walls and a roof, of wall trusses connected with the walls for strengthening the same, and knee-braces connected with the walls and with said trusses.

24. In a caisson, the combination with inclosing walls and a roof therefor, of a wall truss for each of said walls, each of said trusses comprising upper and lower chords connected with the respective walls and braces connecting the chords, each of said braces and chords being provided with knee-braces connected with the respective wall.

25. In a caisson, the combination with inclosing walls and a roof, of a truss for each of said walls comprising upper and lower chords, and members connecting said chords and knee-braces connecting said members with the respective wall.

26. In a caisson, the combination with inclosing walls and a roof therefor, of parallel, longitudinal beams arranged above and connected with the roof and constituting the chords of a truss, transverse beams connecting said longitudinal beams, and diagonal braces connecting said longitudinal beams.

27. In a caisson, the combination with inclosing walls and a roof producing a working chamber, of upright walls extending above the roof producing a cofferdam, and wall trusses formed integral throughout their length with said coffer dam walls.

28. In a caisson, the combination with inclosing walls and a roof forming a working chamber, of vertical walls extending above said roof and producing a coffer dam, vertically disposed trusses arranged parallel to the coffer dam walls and connected therewith throughout their length.

29. In a caisson, the combination with inclosing walls and a roof producing a working chamber, of upright walls extending above the roof producing a coffer dam, vertically disposed trusses arranged parallel to the several coffer dam walls and formed integral therewith, the said coffer dam walls and trusses being cast from concrete.

30. In a caisson, the combination with inclosing walls and a roof, of wall trusses connected with said walls for strengthening the same and braces connecting the said trusses with the said roof.

31. In a caisson the combination with inclosing walls and a roof, of trusses cast integral with said walls throughout their length, and braces cast integral with the trusses and with said roof.

32. In a caisson, the combination with inclosing walls and a roof therefor, of a wall truss for each of said walls cast integral with the wall throughout its length, each of said trusses being provided with vertical studs, and knee-braces cast integral with said vertical studs and also integral with said roof.

33. In a caisson, the combination with inclosing walls, of a roof arranged intermediate the height of said walls producing a working chamber, wall trusses disposed for strengthening the said walls and knee-braces connecting said trusses with the roof.

34. In a caisson the combination with inclosing walls, of a roof therefor, wall trusses arranged above said roof, and knee-braces connecting said wall trusses with the roof.

35. In a caisson, the combination with inclosing walls and a roof therefor, of wall trusses extending above said roof and each comprising parallel chords and connecting studs, and bracing means connecting the said studs with the roof.

36. In a caisson, the combination with inclosing walls and a roof, of wall trusses arranged about and connected with said roof, and knee-braces connected with the roof and with said trusses and extending from the roof to the outermost chords of the trusses.

37. In a caisson the combination with inclosing walls and a roof forming a working chamber, of a truss connected with one of said walls, and a knee-brace connecting said roof with the lower chord of said truss.

38. In a caisson the combination with inclosing walls and a roof, of a wall truss connected with one of said walls, said truss being provided with vertical studs, and a knee-brace formed integral with the roof and integral with one of the studs of said truss, and extending from the roof to the outermost chord of the truss.

39. In a caisson, the combination with inclosing walls, of a roof therefor, and walls extending above the roof for producing a coffer dam, of wall trusses for the coffer dam walls, wall trusses for the walls beneath the roof, knee-braces extending from the roof to the lowermost chord of the trusses beneath the roof and knee-braces extending from the roof to the uppermost chord of the trusses arranged above the roof.

40. In a caisson, the combination with inclosing walls and a roof, of coffer dam trusses extending above said roof and knee-braces extending from the roof to the outermost chord of the coffer dam trusses.

41. In a caisson, the combination with upright concrete walls formed with a cutting edge, and reinforcing trusses embedded in said cutting edges.

42. In a caisson, the combination with concrete inclosing walls formed with a cutting edge, of a metallic truss embedded in such cutting edge.

43. In a caisson, the combination with concrete inclosing walls formed with a cutting edge, of reinforcing trusses arranged at right angles and connected together and embedded in said cutting edge.

44. In a caisson, the combination with concrete inclosing walls formed with a cutting edge, of a metallic truss embedded in said cutting edge and reinforcing bars connected to said truss and embedded within said walls.

45. In a caisson, the combination with concrete inclosing walls, formed with a cutting edge, of a vertical truss embedded in said cutting edge, and a transversely disposed plate secured to said truss and arranged for constituting the penetrating surface of the cutting edge.

46. In a caisson, the combination with inclosing walls having a cutting edge, of a reinforcing open-web truss embedded in said cutting edge.

In testimony whereof I affix my signature in presence of two witnesses.

OLIVER CROMWELL EDWARDS, Jr.

Witnesses:
HENRY COLVIN,
SAMUEL GORDON.